Patented Mar. 18, 1952

2,589,243

UNITED STATES PATENT OFFICE 2,589,243

MODIFIED SILOXANE-ALKYD COPOLYMERS

John T. Goodwin, Jr., and Melvin J. Hunter, Midland, Mich., assignors to Dow Corning Corporation, Midland, Mich., a corporation of Michigan No Drawing. Application March 15, 1950, Serial No. 149,884

2 Claims. (Cl. 260—18)

This invention relates to improved organosiloxane resins and to their method of preparation.

In the copending applications of John T. Goodwin et al., Serial Number 137,472 now U. S. Patent 2,548,341; S. N. 137,474 now U. S. Patent 2,584,343; S. N. 137,475 now U. S. Patent 2,584,344; and Serial Numbers 137,471 and 137,473 filed January 7, 1950, various organosiloxane resins are disclosed and claimed. These materials are prepared by one of two methods; one is that of reacting a silane with a polyhydric alcohol and then with a dibasic acid and the other is that of reacting a partially hydrolyzed alkoxysiloxane with a polyhydric alchool and a dibasic acid. As was shown in these applications, the proportions of organosilicon compound, the alcohol, and the dibasic acid may be varied quite widely. It is also disclosed therein that modified materials may be obtained by including various fatty acid materials in the compound. These fatty acid derivatives were added as acyloxy groups attached to the silicon of the silane.

It is disclosed in the copending application of Melvin J. Hunter et al., Serial Number 59,414 filed November 10, 1948, now U. S. Patent 2,584,351 that organosiloxane resins may be prepared by reacting a silane with a polyhydric alcohol and a dibasic acid and that these materials may be modified by including therein various fatty acids.

All of the formulations disclosed and claimed in the above-mentioned applications produce resinous materials, 50 per cent solutions of which have viscosities of the range of 1 to 2 poises. Whereas this is sufficient for many applications of such resins, for other applications, particularly in the paint industry, it is highly desirable and in fact in some instances necessary that the material have a much higher solution viscosity. If solutions having viscosities of 1 to 2 poises are employed, the paint tends to run off the surface. This defect in the previously employed silicone alkyd resins cannot be remedied by further polymerizing the materials because when such is attempted, the resin becomes insoluble and hence is totally unusable for a coating agent. Consequently, there is a great need for an organosilicon compound of the above type which when dissolved in a 50 per cent solution will have viscosities of the order of 25 to 100 poises.

It is an object of this invention to prepare organosilicon resins which are of particular utility as coating agents. Another object is to prepare an organosilicon material which will have a solution viscosity of the order of 25 to 100 poises. Another object is to prepare organosilicon resins which are heat stable and which possess physical properties approaching those of alkyd resins.

This invention relates to a composition of matter (A) having the composition of 760 parts by weight of an alkoxysiloxane containing from 36.5 to 37.5 per cent by weight silicon-bonded alkoxy groups (said siloxane being composed of 70 mol per cent phenylmethylsiloxane units and 30 mol per cent monophenylsiloxane units); 288 parts by weight 2-ethyl hexoic acid, 78 parts by weight of 12-hydroxy stearic acid, and 174 parts by weight of glycerine.

The above composition may be prepared in the following manner. A mixture of 70 mols per cent phenylmethyldichlorosilane and 30 mol per cent monophenyltrichlorosilane is reacted with an alcohol, preferably one containing less than six carbon atoms. The alcohol is employed in such amount that from 36.5 to 39.5 per cent alkoxy groups are substituted on the silicon. The resulting alkoxychlorosilane mixture is then hydrolyzed by adding thereto water in amount sufficient to react with all the chlorine, whereupon the halogen is removed and the resulting silanols condensed to siloxanes. Due to the much greater reactivity of chlorine, the alkoxy groups are in the main undisturbed. Hence, the resulting alkoxylated polysiloxane possesses about the same alkoxy content as the original silane mixture. The preparation of such alkoxysiloxanes is described in more detail in the copending application of Lawrence A. Rauner, Serial Number 137,480, filed January 7, 1950.

The above alkoxylated siloxane is then reacted with 2-ethyl hexoic acid, 12-hydroxy stearic acid, and glycerine in such amount that the reaction mixture contains 760 parts by weight of the siloxane, 288 parts by weight 2-ethyl hexoic acid, 78 parts by weight 12-hydroxy stearic acid, and 174 parts by weight of glycerine. The order of addition of the reactants is not critical.

In general, the reaction is carried out at temperatures from 150 to 250° C., whereupon condensation takes place between the hydroxyl groups of the glycerine and the alkoxy groups of the silane to produce a copolymer of the siloxane and glycerine. At the same time the acids condense to become an integral part of the copolymer. The precise manner in which the acids are linked to remainder of the molecule is unknown. The condensation of the materials is evidenced by the elimination of alcohol and/or water.

The above material is a fluid which is soluble in aromatic hydrocarbons. This material (A)

may be reacted with a dibasic acid to produce a thermosetting resin. If desired, an additional amount of glycerine may also be included. In general, the composition of the resins so prepared is 200 to 205 parts by weight of A, from 0 to 570 parts by weight additional glycerine, and from 35 to 1410 parts by weight phthalic anhydride. When these resinous materials are polymerized until incipient gellation is reached and the materials are dissolved in an aromatic hydrocarbon so as to give a 50 per cent by weight solution, the resulting solution will have a viscosity of the order of 25 to 100 poises. Such viscosities are not obtained with the siloxane-alkyd copolymers heretofore employed. This solution viscosity apparently is determined by the precise choice of fatty acids incorporated in the resin.

The products of this invention are eminently useful for paint resins, particularly for use at elevated temperatures. They combine the properties of ease of application, smoothness of finish coat, heat stability, and stress-strain properties heretofore unmatched by any known paint composition.

The following examples are illustrative only.

*Example 1*

A mixture of 105.9 parts by weight phenylmethyldichlorosilane and 50.4 parts by weight monophenyltrichlorosilane was agitated and cooled as 87.7 parts by weight isopropanol was added. During addition of the alcohol the temperature was maintained between 14° C. and 20° C. After evolution of HCl was complete, 4.9 parts by weight water was added as the mixture was maintained at a temperature of about 30° C. The hydrolyzate was heated to reflux for five hours, and the volatile materials were finally removed by passing $CO_2$ through the refluxed mixture. The resulting alkoxylated siloxane was neutralized with sodium bicarbonate and filtered through a silica bed. The resulting product contained 38.85 per cent by weight isopropoxy groups.

760 parts by weight of the above alkoxysiloxane was mixed with 288 parts by weight 2-ethyl hexoic acid and 78 parts by weight 12-hydroxy stearic acid. The resulting mixture was agitated and heated at a temperature between 88 and 200° C. for two hours. The mixture was then cooled to 100° C., and 178 parts by weight of U. S. P. glycerine was added. The mixture was heated at a temperature between 94° C. and 200° C. for three hours. During the above reaction water and alcohol were removed. The resulting product was a viscous fluid soluble in aromatic hydrocarbons.

*Example 2*

19 parts by weight glycerine and 85 parts by weight phthalic anhydride were heated until a homogeneous mixture was obtained. The product was mixed with 202 parts by weight of the compound of Example 1 and heated at about 200° C. with stirring until the product began to wrap around the stirrer. The mixture was cooled and dissolved in 200 grams of silane. A 50 per cent xylene solution of the resulting product had a viscosity of 26.2 poises at 25° C. The resin produced an excellent coating when applied to a metal surface and baked thereon.

*Example 3*

A mixture of 31 parts by weight glycerine and 115 parts by weight phthalic anhydride was heated at 140° C. until a homogeneous material was obtained. To this product 200 parts by weight of the material of Example 1 was added, and the mixture was heated at 190 to 225° C. until the reaction product began to wind around the stirrer. The resinous material was dissolved in 224 parts by weight xylene. A 50 per cent xylene solution had a viscosity of 59.3 poises at 25° C.

*Example 4*

The procedure of Example 3 was repeated, except that the following proportions were employed: 49 parts by weight glycerine, 158 parts by weight phthalic anhydride, and 202 parts by weight of the product of Example 1. A 50 per cent xylene solution of the resulting material had a viscosity of 86.9 poises at 25° C.

*Example 5*

Employing the procedure of Example 3, a resinous material having a composition of 85 parts by weight glycerine, 238 parts by weight phthalic anhydride, and 200 parts by weight of the composition of Example 1 was prepared. A 50 per cent xylene solution of the resulting product had a viscosity of 97.3 poises at 25° C.

*Example 6*

202 parts by weight of the product of Example 1 was mixed with 39.5 parts by weight phthalic anhydride and the mixture was heated at 195° C. to 230° C. for 8 hours. The resulting product was dissolved in 100 parts by weight xylene and heated 21 hours at reflux temperature. Upon evaporation of the solvent a resinous material was obtained.

That which is claimed is:

1. A composition of matter resulting from the reaction of 760 parts by weight of an alkoxylated organo polysiloxane, 288 parts by weight 2-ethyl hexoic acid, 78 parts by weight 12-hydroxy stearic acid, and 174 parts by weight glycerine, said alkoxylated polysiloxane having 70 per cent of its silicon atoms bearing a phenyl and a methyl group, 30 per cent of its silicon atoms bearing a phenyl group, the remainder of the silicon-bonded organic groups consisting of alkoxy groups of 1 to 5 carbon atoms, such alkoxy groups amounting to 36.5 to 39.5 per cent by weight of said polysiloxane.

2. A composition of matter composed of from 200 to 205 parts by weight of the composition of claim 1, up to 570 parts by weight glycerine, and 35 to 1410 parts by weight phthalic anhydride.

JOHN T. GOODWIN, Jr.
MELVIN J. HUNTER.

REFERENCES CITED

The following references are of record in the file of this patent:

UNITED STATES PATENTS

| Number | Name | Date |
|---|---|---|
| 2,386,793 | Hanford | Oct. 16, 1945 |
| 2,529,956 | Myles et al. | Nov. 14, 1950 |